US009787577B2

(12) United States Patent
D'Souza et al.

(10) Patent No.: US 9,787,577 B2
(45) Date of Patent: Oct. 10, 2017

(54) METHOD AND APPARATUS FOR OPTIMAL, SCALE INDEPENDENT FAILOVER REDUNDANCY INFRASTRUCTURE

(71) Applicant: Telefonaktiebolaget L M Ericsson (publ), Stockholm (SE)

(72) Inventors: Pramodh D'Souza, San Jose, CA (US); Antoni Przygienda, Sunnyvale, CA (US); Zoltan Toth, Santa Clara, CA (US); Lars Ernstrom, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 222 days.

(21) Appl. No.: 14/618,132

(22) Filed: Feb. 10, 2015

(65) Prior Publication Data

US 2016/0218968 A1  Jul. 28, 2016

Related U.S. Application Data

(60) Provisional application No. 62/107,612, filed on Jan. 26, 2015.

(51) Int. Cl.
*H04L 12/703* (2013.01)
*H04L 29/06* (2006.01)
(Continued)

(52) U.S. Cl.
CPC .......... *H04L 45/28* (2013.01); *H04L 41/0659* (2013.01); *H04L 45/22* (2013.01);
(Continued)

(58) Field of Classification Search
CPC ....... H04L 45/22; H04L 45/245; H04L 45/28; H04L 67/28; H04L 69/22
See application file for complete search history.

(56) References Cited

U.S. PATENT DOCUMENTS

2006/0101157 A1* 5/2006 Eardley .................. H04L 45/00
                                                   709/239
2014/0254352 A1   9/2014 Natarajan et al.
(Continued)

OTHER PUBLICATIONS

IEEE Std 802.1Q™, 2012 Edition, "Media Access Control (MAC) Bridges and Virtual Bridged Local Area Networks," Institute of Electrical and Electronics Engineers, Inc. Standard for Local and metropolitan area networks, 1782 pages.
(Continued)

*Primary Examiner* — Khaled Kassim
*Assistant Examiner* — Zhaohui Yang
(74) *Attorney, Agent, or Firm* — NDWE LLP

(57) ABSTRACT

Exemplary methods performed by a first network device (ND) include generating first and second prefix entries associating incoming Internet Protocol (IP) traffic to first and second data structures (DSs), respectively. Generating the first DS includes generating a first proxy including forwarding information causing incoming IP traffic to be forwarded to a second ND, and generating a second proxy referencing a third DS. Generating the second DS includes generating a first proxy including forwarding information causing incoming IP traffic to be forwarded to the second ND, and generating a second proxy referencing the third DS. The methods include generating the third DS including forwarding information causing the incoming IP traffic to be forwarded to a third ND, the third DS further including first state information indicating whether the forwarding information included in the first proxies of the first and second DSs should be used for forwarding the incoming IP traffic.

21 Claims, 13 Drawing Sheets

(51) Int. Cl.
  *H04L 29/08* (2006.01)
  *H04L 12/707* (2013.01)
  *H04L 12/709* (2013.01)
  *H04L 12/24* (2006.01)
(52) U.S. Cl.
  CPC ............ *H04L 45/245* (2013.01); *H04L 67/28* (2013.01); *H04L 69/22* (2013.01); *H04L 41/0668* (2013.01)

(56) References Cited

U.S. PATENT DOCUMENTS

2014/0369186 A1* 12/2014 Ernstrom ............ H04L 41/0668
  370/228
2016/0112316 A1  4/2016 Wang et al.

OTHER PUBLICATIONS

RFC 793: "Transmission Control Protocol; DARPA Internet Program; Protocol Specification" (Sep. 1981); 85 pages.
Ali, et al., "Node-ID Based Resource Reservation Protocol (RSVP) Hello: A Clarification Statement", Network Working Group, Network Working Group, Request for Comments: 4558, The Internet Society, (Jun. 2006), 8 pages.
Andersson, L., et al., "LDP Specification", Network Working Group, Request for Comments: 5036, (Oct. 2007), 136 pages.
Awduche, D., et al., "RSVP-TE: Extensions to RSVP for LSP Tunnels", Network Working Group, Request for Comments: 3209, The Internet Society, http://tools.ietf.org/html/rfc3209, (Dec. 2001), 62 pages.
Babiarz, J., et al., "Configuration Guidelines for DiffServ Service Classes", Network Working Group, Request for Comments: 4594, The Internet Society, (Aug. 2006), 57 pages.
Baker, F., "A Differentiated Services Code Point (DSCP) for Capacity-Admitted Traffic", Internet Engineering Task Force (IETF), Request for Comments: 5865, IETF Trust, (May 2010), 14 pages.
Baker, F., et al., "Management Information Base for the Differentiated Services Architecture", Network Working Group, Request for Comments: 3289, The Internet Society, (May 2002), 116 pages.
Berger, L., "Generalized Multi-Protocol Label Switching (GMPLS) Signaling Resource ReserVation Protocol-Traffic Engineering (RSVP-TE) Extensions", Network Working Group, Request for Comments: 3473, http://tools.ietf.org/html/rfc3473, (Jan. 2003), 42 pages.
Bernet, Y., et al., "An Informal Management Model for Diffserv Routers", Network Working Group, Request for Comments: 3290, The Internet Society, (May 2002), 56 pages.
Black, D., "Differentiated Services and Tunnels", Network Working Group, Request for Comments: 2983, The Internet Society, (Oct. 2000), 14 pages.
Black, D., et al., "Per Hop Behavior Identification Codes", Network Working Group, Request for Comments: 3140, The Internet Society, (Jun. 2001), 8 pages.
Blake, S., et al., "An Architecture for Differentiated Services", Network Working Group, Request for Comments 2475, The Internet Society, (Dec. 1998), 37 pages.
Borman, D., et al., "IPy6 Jumbograms", Network Working Group, Request for Comments: 2675, The Internet Society, (Aug. 1999), 9 pages.
Braden, et al., "Resource ReSerVation Protocol (RSVP)—Version 1 Functional Specification", Network Working Group, Request for Comments: 2205, (Sep. 1997), 113 pages.
Chan, K., et al., "Differentiated Services Quality of Service Policy Information Base", Network Working Group, Request for Comments: 3317, The Internet Society, (Mar. 2003), 96 pages.
Charny, A., et al., "Supplemental Information for the New Definition of the EF PHB (Expedited Forwarding Per-Hop Behavior)", Network Working Group, Request for Comments: 3247, The Internet Society, (Mar. 2002), 24 pages.

Coltun, et al., "OSPF for IPv6", Network Working Group Request for Comments: 5340, IETF, https://tools.ietf.org/html/rfc5340, (Jul. 2008), 95 pages.
Davie, B., et al., "An Expedited Forwarding PHB (Per-Hop Behavior)", Network Working Group, Request for Comments: 3246, The Internet Society, (Mar. 2002), 16 pages.
Deering, et al., "Internet Protocol, Version 6 (IPv6) Specification", Network Working Group, Request for Comments: 2460, The Internet Society, (Dec. 1998), 39 pages.
Eggert, L. , et al., "Unicast UDP Usage Guidelines for Application Designers", Network Working Group, Request for Comments: 5405, IETF Trust, (Nov. 2008), 27 pages.
Fenner, B., et al., "Management Information Base for the User Datagram Protocol (UDP)", Network Working Group, Request for Comments: 4113, The Internet Society, (Jun. 2005), 19 pages.
Grossman, D., "New Terminology and Clarifications for Diffserv", Network Working Group, Request for Comments: 3260, The Internet Society, (Apr. 2002), 10 pages.
Hedrick, C., "Routing Information Protocol", Network Working Group, Request for Comments: 1058, (Jun. 1988), 34 pages.
Heinanen, J., et al., "Assured Forwarding PHB Group", The Internet Society, RFC 2597, (Jun. 1999), 11 pages.
Hopps, C., "Analysis of an Equal-Cost Multi-Path Algorithm", Network Working Group, Request for Comments: 2992, The Internet Society, (Nov. 2000), 8 pages.
Housley, "Using Advanced Encryption Standard (AES) CCM Mode with IPsec Encapsulating Security Payload (ESP)", Network Working Group, Request for Comments: 4309, The Internet Society, (Dec. 2005), 14 pages.
Kent, et al., "Security Architecture for the Internet Protocol", Network Working Group, Request for Comments: 4301, The Internet Society, (Dec. 2005), 102 pages.
Kompella, et al., "Procedures for Modifying the Resource reSerVation Protocol (RSVP)", Network Working Group, Request for Comments: 3936, The Internet Society, (Oct. 2004), 8 pages.
Malkin, G., "RIP Version 2", Network Working Group, Request for Comments: 2453, The Internet Society, (Nov. 1998), 40 pages.
Malkin, et al., "RIPng for IPv6", Network Working Group, Request for Comments: 2080, (Jan. 1997), 20 pages.
Moy, J., "OSPF Version 2", Network Working Group, Request for Comments: 2328, The Internet Society, (Apr. 1998), 244 pages.
Nichols, K., et al., "Definition of Differentiated Services Per Domain Behaviors and Rules for their Specification", Network Working Group, Request for Comments: 3086, The Internet Society, (Apr. 2001), 24 pages.
Nichols, K., et al., "Definition of the Differentiated Services Field (DS Field) in the IPv4 and IPv6 Headers", Network Working Group, Request for Comments: 2474, The Internet Society, (Dec. 1998), 20 pages.
Oran, David, "OSI ISIS Intradomain Routing Protocol", Network Working Group, Request for Comments: 1142, (Feb. 1990), 157 pages.
Polk, et al., "A Resource Reservation Protocol (RSVP) Extension for the Reduction of Bandwidth of a Reservation Flow", Network Working Group, Request for Comments: 4495, The Internet Society, (May 2006), 22 pages.
Postel, J., "User Datagram Protocol", RFC 768, (Aug. 28, 1980), 3 pages.
Rekhter, Y., et al., "A Border Gateway Protocol 4 (BGP-4)", Network Working Group, Request for Comments: 4271, (Jan. 2006), 105 pages.
Rosen, et al., "BGP/MPLS IP Virtual Private Networks (VPNs)", Network Working Group, Request for Comments: 4364, The Internet Society, (Feb. 2006), 47 pages.
Shenker, et al., "Specification of Guaranteed Quality of Service", Network Working Group, Request for Comments: 2212, (Sep. 1997), 20 pages.
Socolofsky, T., et al., "A TCP/IP Tutorial", Network Working Group, Request for Comments: 1180, (Jan. 1991), 28 pages.
Thaler, et al., "Multipath Issues in Unicast and Multicast Next-Hop Selection", Network Working Group, Request for Comments: 2991, The Internet Society, (Nov. 2000), 9 pages.

(56) References Cited

OTHER PUBLICATIONS

Wroclawski, J., "Specification of the Controlled-Load Network Element Service", *Network Working Group, RFC: 2211*, (Sep. 1997), 20 pages.

Wroclawski, J., "The Use of RSVP with IETF Integrated Services", *Network Working Group, Request for Comments: 2210*, (Sep. 1997), 34 pages.

* cited by examiner

800

```
┌─────────────────────────────────────────────────────────────────────────────┐
│ Generate a first prefix entry and a second prefix entry, wherein the first  │
│ prefix entry and the second prefix entry include information for            │
│ associating incoming IP traffic to a first data structure                   │
│ and a second data structure, respectively                                   │
│                                   805                                       │
└─────────────────────────────────────────────────────────────────────────────┘
                                      │
                                      ▼
┌─────────────────────────────────────────────────────────────────────────────┐
│ Generate the first data structure by generating a first proxy of the first  │
│ data structure that includes forwarding information for causing the         │
│ incoming IP traffic to be forwarded to a second network device, and         │
│ generating a second proxy of the first data structure that references a     │
│ third data structure                                                        │
│                                   810                                       │
└─────────────────────────────────────────────────────────────────────────────┘
                                      │
                                      ▼
┌─────────────────────────────────────────────────────────────────────────────┐
│ Generate the second data structure by generating a first proxy of the       │
│ second data structure that includes forwarding information for causing the  │
│ incoming IP traffic to be forwarded to the second network device, and       │
│ generating a second proxy of the second data structure that references the  │
│ third data structure                                                        │
│                                   815                                       │
└─────────────────────────────────────────────────────────────────────────────┘
                                      │
                                      ▼
┌─────────────────────────────────────────────────────────────────────────────┐
│ Generate the third data structure, wherein the third data structure         │
│ includes forwarding information for causing the incoming IP traffic to be   │
│ forwarded to a third network device, and wherein the third data structure   │
│ further includes first state information indicating whether the forwarding  │
│ information included in the first proxy of the first data structure and the │
│ first proxy of the second data structure should be used for forwarding the  │
│ incoming IP traffic                                                         │
│                                   820                                       │
└─────────────────────────────────────────────────────────────────────────────┘
```

FIG. 8

METHOD AND APPARATUS FOR OPTIMAL, SCALE INDEPENDENT FAILOVER REDUNDANCY INFRASTRUCTURE

CROSS-REFERENCE TO RELATED APPLICATIONS

This application claims the benefit of U.S. Provisional Application No. 62/107,612, filed Jan. 26, 2015, which is hereby incorporated by reference.

FIELD

Embodiments of the invention relate to the field of packet networks, and more specifically, to the optimal convergence of next hop entries.

BACKGROUND

In a conventional router or switch device, next hop (NH) entries typically form fixed chains, and packets are processed by the device as they traverse these chains. A NH entry can either be a non-connected NH entry or a connected NH entry. As used herein, a non-connected NH (non-CNH) entry is a data structure that contains information chaining (i.e., linking) it to another NH entry, and a connected NH (CNH) entry is a data structure that contains information which enables the packets to be forwarded to a connected physical device (i.e., a device that is the immediate next hop in the network).

FIG. 1 illustrates conventional Fast Re-Route (FRR) device 100 comprising of conventional FRR NH entries 101-102. FRR NH entries are commonly referred to as "double barrel" next hop entries because each FRR NH entry references two other next hop entries: a primary next-hop entry and a backup next-hop entry, which is used when the primary chain fails. As used herein, one NH entry "referencing" another NH entry refers to a NH entry containing an identifier/pointer that maps/points (i.e., references) another NH entry. In FIG. 1, FRR NH entry 101 includes Forwarding Information Base (FIB) NH entry 111 that references non-CNH entry 112, which in turn references CNH entry 113. NH entries 111-113 comprise the primary chain. FRR NH entry 101 also includes FIB NH entry 115 that references non-CNH entry 116, which in turn references CNH entry 117. NH entries 115-117 comprise the backup chain, which is used when the primary chain (i.e., NH entries 111-113) fails. Similarly, FRR NH entry 102 includes FIB NH entry 121 that references non-CNH entry 122, which in turn references CNH entry 123. NH entries 121-123 comprise the primary chain. FRR NH entry 102 also includes FIB NH entry 125 that references non-CNH entry 126, which in turn references CNH entry 127. NH entries 125-127 comprise the backup chain, which is used when the primary chain (i.e., NH entries 121-123) fails. It should be noted that there can be zero or more non-CNH entries in any given chain. For example, FIB NH entry 111 can reference CNH entry 113 directly, without having to reference non-CNH entry 112. By way of further example, non-CNH entry 112 can alternatively reference another non-CNH entry instead of directly referencing CNH entry 113 as illustrated in FIG. 1.

When switching from the primary chain to the backup chain (e.g., performing a failover), or vice versa, the device needs to be programmed with the correct next-hop entry that is to be used. This is not a problem when the number of FRR-NH entries is small. However, when a single event causes the switching of hundreds of thousands of FRR NH entries, it can take many seconds to reprogram the device with the new next-hop information. For example, when hundreds of thousands of NH entries contain forwarding information that causes network traffic to be sent to a same link (e.g., a Layer 3 (L3) Link Aggregation (LAG) link), and that same link fails, each and every one of the hundreds of thousands of NH entries need to be individually re-programmed in order for traffic to be diverted/redirected to another link. Such a reconvergence mechanism is very time consuming and can result in loss of traffic.

SUMMARY

Exemplary methods performed by a first network device that is communicatively coupled to a plurality of other network devices in a network, include generating a first prefix entry and a second prefix entry, wherein the first prefix entry and the second prefix entry include information for associating incoming Internet Protocol (IP) traffic to a first data structure and a second data structure, respectively. In one embodiment, the methods further include generating the first data structure by generating a first proxy of the first data structure that includes forwarding information for causing the incoming IP traffic to be forwarded to a second network device, and generating a second proxy of the first data structure that references a third data structure. According to one embodiment, the methods include generating the second data structure by generating a first proxy of the second data structure that includes forwarding information for causing the incoming IP traffic to be forwarded to the second network device, and generating a second proxy of the second data structure that references the third data structure. In one embodiment, the methods further include generating the third data structure, wherein the third data structure includes forwarding information for causing the incoming IP traffic to be forwarded to a third network device, and wherein the third data structure further includes first state information indicating whether the forwarding information included in the first proxy of the first data structure and the first proxy of the second data structure should be used for forwarding the incoming IP traffic.

According to one embodiment, the methods include in response to receiving an IP packet, using the first prefix entry to associate the IP packet to the first data structure, using the second proxy of the first data structure to reference the third data structure, and in response to determining the first state information of the third data structure indicates that the forwarding information included in the first proxy of the first data structure should be used for forwarding the IP packet, using the forwarding information included in the first proxy of the first data structure to forward the IP packet to the second network device.

In one embodiment, the methods include in response to a network failure that prevents network traffic from being forwarded to the second network device, updating the first state information of the third data structure to indicate that the forwarding information included in the first proxy of the first data structure and the first proxy of the second data structure should not be used for forwarding the incoming IP traffic to the second network device.

According to one embodiment, the methods further include in response to receiving an IP packet, using the second prefix entry to associate the IP packet to the second data structure, using the second proxy of the second data structure to reference the third data structure, and in response to determining the first state information of the third data structure indicates that the forwarding information included in the first proxy of the second data structure should not be used for forwarding the IP packet, using the forwarding information included in the third data structure to forward the IP packet to the third network device.

In one embodiment, generating the first data structure further comprises generating a third proxy of the first data structure that references a fourth data structure, and the third data structure further includes second state information indicating whether the forwarding information included in the third data structure should be used for forwarding the incoming IP traffic. In one such embodiment, the methods further include generating the fourth data structure, wherein the fourth data structure includes forwarding information for causing the incoming IP traffic to be forwarded to a fourth network device, and wherein the fourth data structure further includes third state information indicating whether the forwarding information included in the fourth data structure should be used for forwarding the incoming IP traffic.

According to at least one embodiment, the methods include in response to receiving an IP packet, using the first prefix entry to associate the IP packet to the first data structure, and using the second proxy of the first data structure to reference the third data structure. In one such embodiment, in response to determining the first state information of the third data structure indicates that the forwarding information included in the first proxy of the first data structure should not be used for forwarding the IP packet, the methods include using the second state information of the third data structure to determine how to forward the IP packet. The methods further include in response to determining the second state information of the third data structure indicates that the forwarding information included in the third data structure should not be used for forwarding the IP packet, using the third state information of the fourth data structure to determine how to forward the IP packet, and in response to determining the third state information of the fourth data structure indicates that the forwarding information included in the fourth data structure should be used for forwarding the IP packet, using the forwarding information included in the fourth data structure to forward the IP packet to the fourth network device.

According to one embodiment, the first network device is configured to serve as an active inter-chassis redundancy (ICR) device of an ICR system, and the third network device is configured to serve as a standby ICR device of the ICR system.

BRIEF DESCRIPTION OF THE DRAWINGS

The invention may best be understood by referring to the following description and accompanying drawings that are used to illustrate embodiments of the invention. In the drawings:

FIG. 8 is a flow diagram illustrating a method for generating FRR NHs and state information collections according to one embodiment.

DESCRIPTION OF EMBODIMENTS

Figure 1:
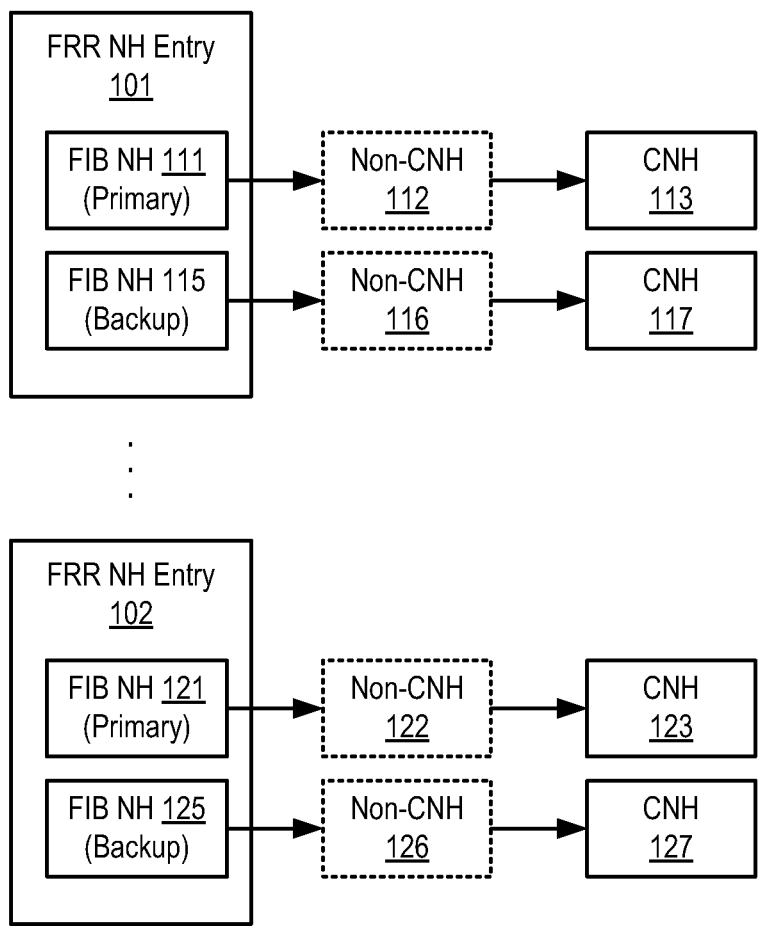
FIG. 1 is a block diagram illustrating the chaining of FRR NH entries in a conventional FRR device.

The following description describes methods and apparatus for performing quick convergence of next hop entries. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 2:
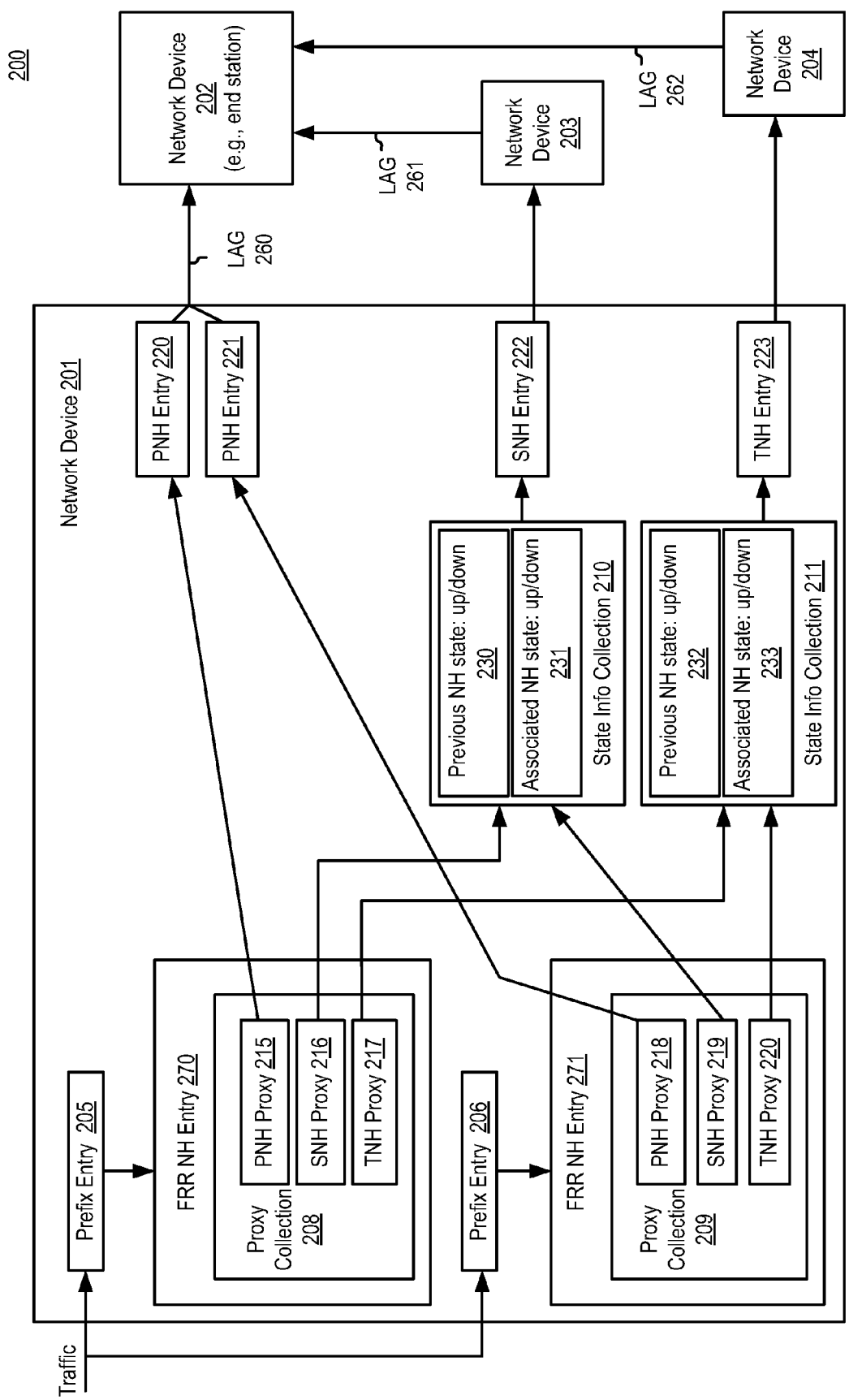
FIG. 2 is a block diagram illustrating a FRR device according to one embodiment.

FIG. 2 is a block diagram illustrating network 200 comprising of network devices 201-204. The network configuration shown in FIG. 2 is intended for illustrative purposes, and not intended to be limitations of the present invention. In this illustrated example, network device 201 is communicatively coupled to network device 202 via L3 LAG link 260. A L3 LAG link shall herein be referred to simply as a LAG. A LAG is a link directly connecting two network devices with multiple IP-addressed link paths (each link path is assigned a different IP address), and a load distribution decision across these different link paths is performed at the network device forwarding plane. For example, the IP traffic coming into network device 201 can include multiple destination IP addresses intended for multiple subscribers at network device 202, wherein some or all of the IP traffic can be forwarded to the subscribers at network device 202 via LAG 260.

In one embodiment, network device 201 and network devices 203 and/or 204 can form an inter-chassis redundancy (ICR) system. For example, network device 201 can be configured as an active ICR device while network devices 203 and/or 204 can be configured as standby ICR device(s). In such a configuration, network device 201 is to forward incoming IP traffic to network device 202 while LAG 260 is up (i.e., operational). In the event that LAG 260 is down (i.e., non-operational), the ICR devices switch roles, and network device 201 starts forwarding the incoming IP traffic to either network device 203 or 204, now operating as the active ICR device, which in turn will forward the traffic to network device 202 via LAGs 261 or 262, respectively. It should be understood that there can be other network devices that interconnect network devices 203 and 204 with network device 202. For example, LAGs 261-262 can connect devices 203-204, respectively, to one or more other network devices that connect to network device 202.

In a typical network configuration, there can be thousands of IP traffic streams flowing through a single LAG (e.g., intended for thousands of subscribers). Such IP traffic may be referred to as having a "shared fate" because when the single LAG fails, they all share the same fate (i.e., loss of connectivity). Conventionally, when a LAG fails, all FRR NH entries which send traffic to the failed LAG need to be individually reprogrammed in order to divert the traffic to a backup device. Thus, the failure of a single LAG can cause all such subscriber traffic to be interrupted for a substantial period of time. Embodiments of the present overcome such limitations by providing mechanisms for reconverging all FRR NH entries that share the same fate quickly.

According to one embodiment, network device 201 includes a plurality of prefix entries, each of which includes information for associating incoming IP traffic with a corresponding FRR NH entry. Each of the prefix entries, according to one embodiment, is implemented as one or more data structures stored in a storage device accessible by network device 201. In one embodiment, each prefix entry includes an IP prefix and a reference to a FRR NH entry. In the illustrated example, prefix entry 205 associates incoming IP traffic with FRR NH entry 270, and prefix entry 206 associates incoming IP traffic with FRR NH entry 271. Thus, for example, when an incoming IP packet contains a destination IP address which belongs to (e.g., matches) the IP prefix contained in prefix entry 205, prefix entry 205 causes the IP packet to be processed/forwarded based on the information contained in FRR NH entry 270.

According to one embodiment, each of the plurality of FRR NH entries can be implemented as one or more data structures stored in one or more storage devices accessible by network device 201. In one embodiment, FRR NH entry 270 comprises proxy collection 208, which includes, but is not limited to, primary next hop (PNH) proxy 215, secondary next hop (SNH) proxy 216, and ternary next hop (TNH) proxy 217. It should be noted that more proxies can be included as part of proxy collection 208. In one embodiment, PNH proxy 215 includes forwarding information for indirectly causing the incoming IP traffic associated with proxy collection 208 to be forwarded to network device 202. For example, PNH proxy 215 includes information referencing PNH entry 220, which in turn includes forwarding information for causing the incoming IP traffic to be sent to LAG 260. In an alternative embodiment, PNH proxy 215 can include forwarding information for directly causing the incoming IP traffic associated with proxy collection 208 to be forwarded to network device 202. For example, PNH proxy 215 can include forwarding information for causing the incoming IP traffic to be sent to LAG 260. In one embodiment, SNH proxy 216 and TNH proxy 217 include information referencing state information (info) collections 210 and 211, respectively. State info collections 210 and 211 are described in further details below.

In one embodiment, FRR NH entry 271 comprises proxy collection 209, which includes, but is not limited to, PNH proxy 218, SNH proxy 219, and TNH proxy 220. It should be noted that more proxies can be included as part of proxy collection 209. In one embodiment, PNH proxy 218 includes forwarding information for indirectly causing the incoming IP traffic associated with proxy collection 209 to be forwarded to network device 202. For example, PNH proxy 218 includes information referencing PNH entry 221, which in turn includes forwarding information for causing the incoming IP traffic to be sent to LAG 260. In an alternative embodiment, PNH proxy 218 can include forwarding information for directly causing the incoming IP traffic associated with proxy collection 209 to be forwarded to network device 202. For example, PNH proxy 218 can include forwarding information for causing the incoming IP traffic to be sent to LAG 260. In one embodiment, SNH proxy 219 and TNH proxy 220 include information referencing state info collections 210 and 211, respectively.

Conventionally, when LAG 260 fails, all FRR NH entries that share LAG 260 need to be individually reprogrammed to divert traffic to another network device (e.g., network device 203 or 204). The number of FRR NH entries which share LAG 260 can be in the thousands, and thus, the time to reconverge all such FRR NH entries can be on the order of seconds. Embodiments of the present invention overcome such limitations by providing state info collections 210 and 211, each of which can be implemented as one or more data structures stored in one or more storage devices accessible by network device 201.

In one embodiment, state info collection 210 includes forwarding information for indirectly causing the incoming IP traffic associated with proxy collections 208 and 209 to be forwarded to network device 203. For example, state info collection 210 includes information referencing SNH entry 222, which in turn includes forwarding information for causing the incoming IP traffic to be sent to network device 203 (e.g., via an IP interface). In an alternative embodiment, state info collection 210 can include forwarding information for directly causing the incoming IP traffic associated with proxy collections 208 and 209 to be forwarded to network device 203. For example, state info collection 210 can include forwarding information for causing the incoming IP traffic to be sent to the IP interface which connects to network device 203.

According to one embodiment, state info collection 210 includes previous NH state 230 and associated NH state 231. Previous NH state 230 contains information indicating whether the links associated with the previous proxy (e.g., PNH proxies 215 and 218) are up (i.e., operational). In such an embodiment, the information contained in previous NH state 230 can be used for determining whether the forwarding information included in the previous proxy (e.g., PNH proxies 215 and 218) should be used for forwarding the incoming IP traffic. For example, a state value of "UP" in previous NH state 230 indicates that the forwarding information included in the previous proxy (e.g., PNH proxies 215 and 218) should be used for forwarding the incoming IP traffic.

According to one embodiment, state info collection 210 further includes associated NH state 231, which contains information indicating whether the links associated with state info collection 210 are up (i.e., operational). In such an embodiment, the information contained in associated NH state 231 can be used for determining whether the forwarding information included in state info collection 210 should be used for forwarding the incoming IP traffic. For example, a state value of "UP" in associated NH state 231 indicates that the forwarding information included in state info collection 210 should be used for forwarding the incoming IP traffic.

In one embodiment, state info collection 211 includes forwarding information for indirectly causing the incoming IP traffic associated with proxy collections 208 and 209 to be forwarded to network device 204 (e.g., via an IP interface). For example, state info collection 211 includes information referencing TNH entry 223, which in turn includes forwarding information for causing the incoming IP traffic to be sent to network device 204. In an alternative embodiment, state info collection 211 can include forwarding information for directly causing the incoming IP traffic associated with proxy collections 208 and 209 to be forwarded to network device 204. For example, state info collection 211 can include forwarding information for causing the incoming IP traffic to be sent to the IP interface which connects to network device 204.

According to one embodiment, state info collection 211 includes previous NH state 232 and associated NH state 233. Previous NH state 232 contains information indicating whether the links associated with the previous proxy (e.g., SNH proxies 216 and 219) are up (i.e., operational). In such an embodiment, the information contained in previous NH state 232 can be used for determining whether the forwarding information included in the previous proxy (e.g., SNH proxies 216 and 219) should be used for forwarding the incoming IP traffic.

According to one embodiment, state info collection 211 further includes associated NH state 233, which contains information indicating whether the links associated with state info collection 211 are up (i.e., operational). In such an embodiment, the information contained in associated NH state 233 can be used for determining whether the forwarding information included in state info collection 211 should be used for forwarding the incoming IP traffic. For example, a state value of "UP" in associated NH state 233 indicates that the forwarding information included in state info collection 211 should be used for forwarding the incoming IP traffic.

It should be noted that network device 201 can include other state info collections. For example, FRR NH entry 270 and/or FRR NH entry 271 can include one or more other proxies, each of which can reference a respective state info collection. It should be further noted that although only two FRR NH entries are illustrated as sharing state info collections 210 and 211, network device 201 can, and typically does, include more FRR NH entries that reference state info collections 210 and 211, thus, enabling the quick reconvergence of all such FRR NH entries when a shared LAG (e.g., LAG 260) fails. The use of proxy collections 208-209 and state info collections 210-211 for performing fast reconvergence of FRR NH entries 270-271 shall now be illustrated through the description of FIGS. 3A and 3B.

Figure 3A:
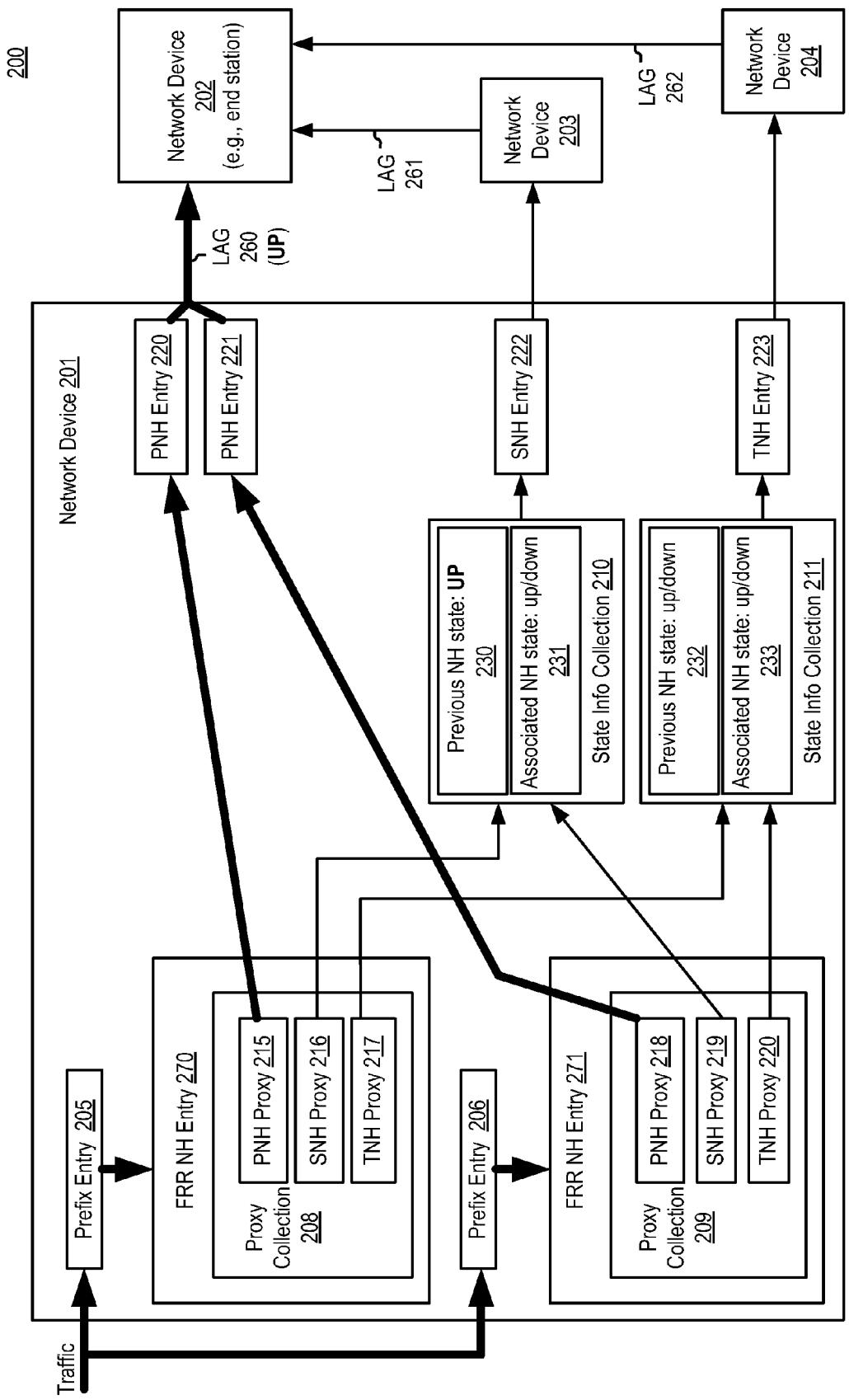
FIG. 3A is a block diagram illustrating a FRR device according to one embodiment.
Figure 3B:
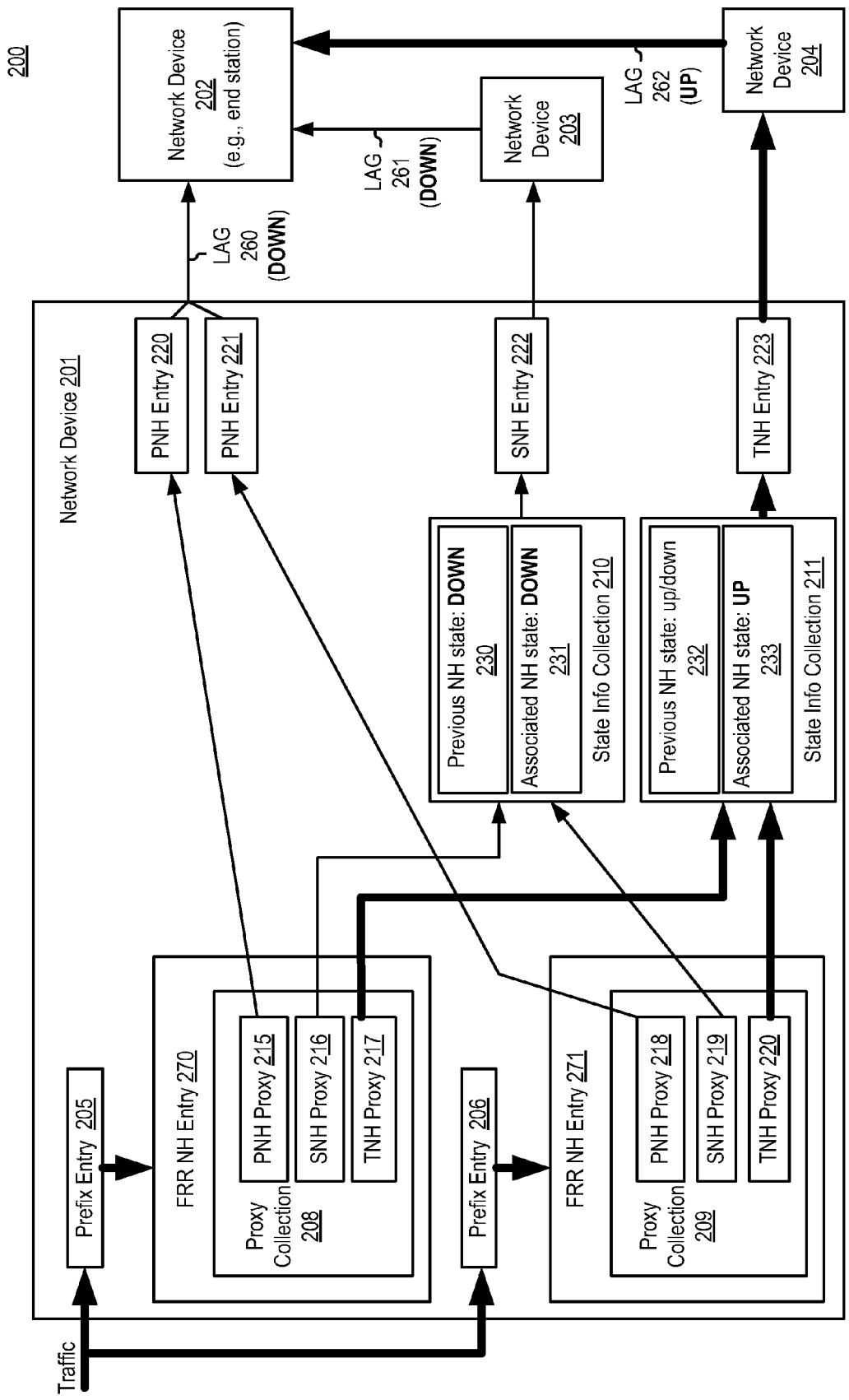
FIG. 3B is a block diagram illustrating a FRR device according to one embodiment.

FIGS. 3A-3B are block diagrams illustrating network 200 comprising of network devices 201-204. Networks 200 of FIGS. 3A-3B are similar to network 200 of FIG. 2. For the sake of brevity, networks 200 of FIGS. 3A-3B will not be described here. FIG. 3A illustrates the case where LAG 260 is up (i.e., operational), and thus, network device 201 has configured previous NH state 230 to indicate the links associated with PNH proxies 215 and 218 are up. A state value of "UP" in previous NH state 230 indicates the forwarding information included in PNH proxies 215 and 218 should be used for forwarding IP traffic associated with proxy collections 208 and 209, respectively. Thus, in response to receiving IP traffic that are associated with proxy collections 208 and 209, network device 201 uses the forwarding information contained in PNH proxies 215 and 218, respectively, to forward the IP traffic to network device 202 using PNH entries 220 and 221, respectively, and LAG 260.

FIG. 3B illustrates the case where LAG 260 is down (i.e., non-operational), and thus, network device 201 has configured previous NH state 230 to indicate the links associated with PNH proxies 215 and 218 are down. A state value of "DOWN" in previous NH state 230 indicates the forwarding information included in PNH proxies 215 and 218 should not be used for forwarding IP traffic associated with proxy collections 208 and 209, respectively. In FIG. 3B, LAG 261 is also down (i.e., non-operational), and thus, network device 201 has configured associated NH state 231 to indicate the links associated with state info collection 210 are down. A state value of "DOWN" in associated NH state 231 indicates the forwarding information included in state info collection 210 should not be used for forwarding IP traffic associated with proxy collections 208 and 209. LAG 262, however, is up (i.e., operational) in FIG. 3B, and thus, network device 201 has configured associated NH state 233 to indicate the links associated with state info collection 211 are up. A state value of "UP" in associated NH state 233 indicates the forwarding information included in state info collection 211 should be used for forwarding IP traffic associated with proxy collections 208 and 209. Thus, in response to receiving IP traffic that are associated with proxy collections 208 and 209, network device 201 uses the forwarding information contained in state info collection 211 to forward the IP traffic to network device 204 for using LAG 262, instead of attempting to forward the IP traffic using the downed LAGs 260-261 to network device 202.

It should be noted that by configuring previous NH state 230 and associated NH states 231, 233 with the state values of "DOWN", "DOWN", and "UP", respectively, network device 201 is able to reprogram all FRR NH entries which forwarded their IP traffic to LAGs 260-261 (e.g., FRR NH entries 270-271) to divert/redirect their IP traffic to network device 204 (which in turn will forward the IP traffic on LAG 262). Contrary to a conventional FRR device, network device 201 does not need to individually reprogram each of the thousands of FRR NH entries when LAGs 260-261 are down.

Figure 4:
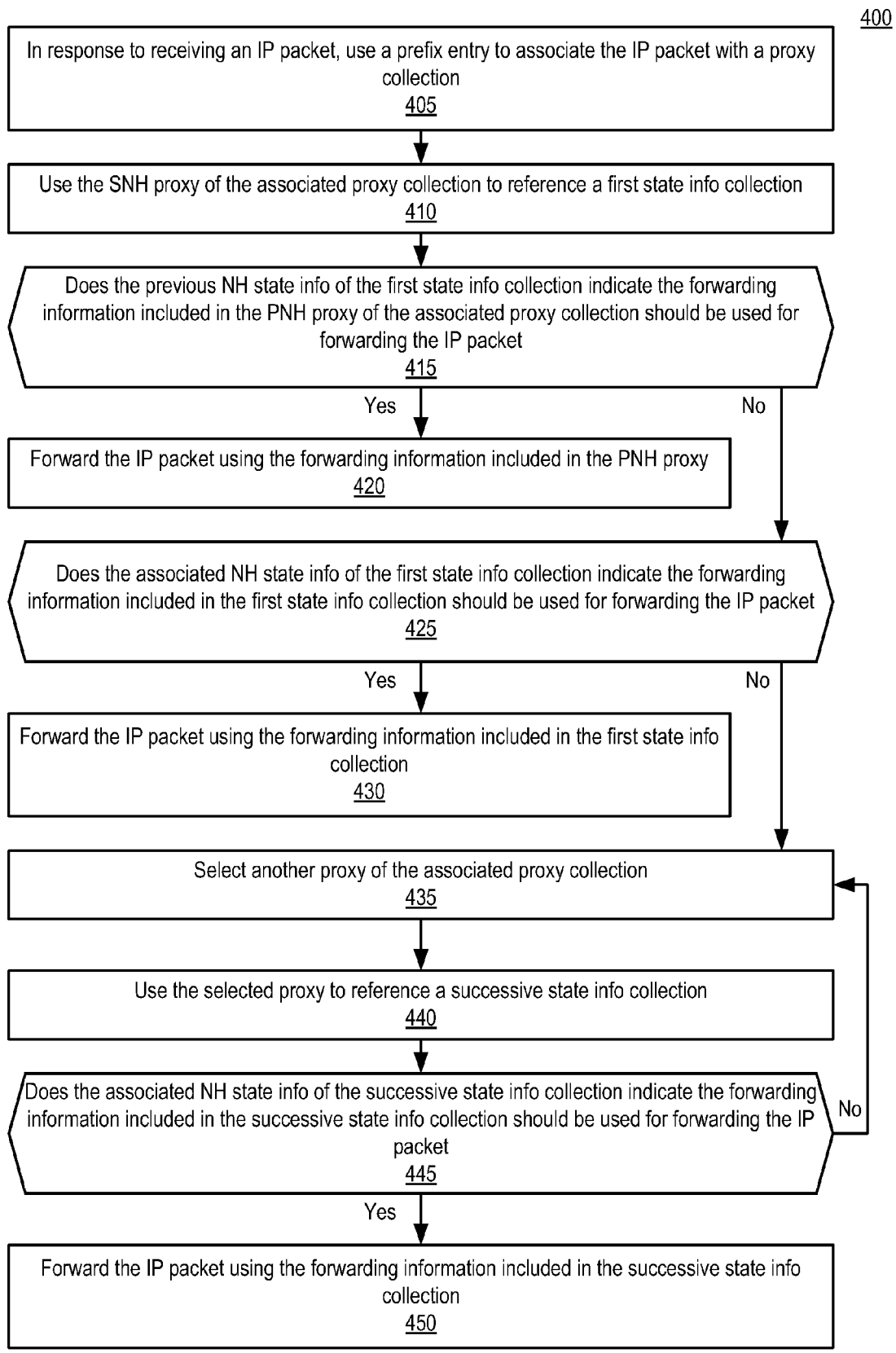
FIG. 4 is a flow diagram illustrating a method for performing fast reconvergence of FRR NH entries according to one embodiment.

FIG. 4 is a flow diagram illustrating a method for forwarding IP packets according to one embodiment. For example, method 400 can be performed by network device 201, which can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. FIG. 4 shall now be described with reference to the embodiments illustrated in FIGS. 3A-3B.

Referring now to FIG. 4, at block 405, a network device in response to receiving an IP packet, uses a prefix entry to associate the IP packet with a proxy collection. For example, network device 201 receives a first IP packet with a destination IP address that belongs to (e.g., matches) the IP prefix contained in prefix entry 205, and a second IP packet with a destination IP address that belongs to the IP prefix contained in prefix entry 206. Accordingly, network device 201 uses prefix entries 205-206 to associate the first and second IP packets, respectively, with proxy collections 208-209, respectively.

At block 410, the network device uses the SNH proxy of the associated proxy collection to reference a first state info collection. For example, network device 201 uses SNH proxies 216 and 219 to reference state info collection 210. At block 415, the network device determines whether the previous NH state info of the first state info collection indicates the forwarding information included in the PNH proxy of the associated proxy collection should be used for forwarding the IP packet. For example, network device 201 determines whether previous NH state info 230 contains a state value of "UP", indicating the forwarding information included in PNH proxies 215 and 218 should be used for forwarding the first and second IP packets, respectively.

At block 420, in response to determining the previous NH state info of the first state info collection indicates the forwarding information included in the PNH proxy of the associated proxy collection should be used for forwarding the IP packet ("Yes" branch of block 415), the network device forwards the IP packet using the forwarding information included in the PNH proxy of the associated proxy collection. For example, in response to determining previous NH state info 230 indicates the forwarding information included in PNH proxies 215 and 218 should be used for forwarding the first and second IP packets, respectively, network device 201 forwards the first and second IP packets using the forwarding information included in PNH proxies 215 and 218, respectively, to LAG 260 (as illustrated in FIG. 3A), using PNH entries 220 and 221, respectively.

At block 425, in response to determining the previous NH state info of the first state info collection indicates the forwarding information included in the PNH proxy of the associated proxy collection should not be used for forwarding the IP packet ("No" branch of block 415), the network device determines whether the associated NH state info of the first state info collection indicates the forwarding information included in the first state info collection should be used for forwarding the IP packet. For example, in response to determining previous NH state info 230 indicates the forwarding information included in PNH proxies 215 and 218 should not be used for forwarding the first and second IP packets, respectively, network device 201 determines whether associated NH state info 231 indicates the forwarding information included in state info collection 210 should be used for forwarding the first and second IP packets.

At block 430, in response to determining the associated NH state info of the first state info collection indicates the forwarding information included in the first state info collection should be used for forwarding the IP packet ("Yes" branch of block 425), the network device forwards the IP packet using the forwarding information included in the first state info collection. For example, in response to determining associated NH state info 231 indicates the forwarding information included in state info collection 210 should be used for forwarding the first and second IP packets, network device 201 forwards the first and second IP packets using the forwarding information included in state info collection 210 to network device 203, using SNH entry 222.

At block 435, in response to determining the associated NH state info of the first state info collection indicates the forwarding information included in the first state info collection should not be used for forwarding the IP packet ("No" branch of block 425), the network device selects another proxy of the associated proxy collection. For example, in response to determining associated NH state info 231 indicates the forwarding information included in state info collection 210 should not be used for forwarding the first and second IP packets, the network device selects TNH proxies 217 and 220, respectively.

At block 440, the network device uses the selected proxy to reference a successive state info collection. For example, network device 201 uses TNH proxies 217 and 220 to reference state info collection 211. At block 445, the network device determines whether the associated NH state info of the successive state info collection indicates the forwarding information included in the successive state info collection should be used for forwarding the IP packet. For example, network device 201 determines whether associated NH state info 233 indicates the forwarding information included in state info collection 211 should be used for forwarding the first and second IP packets to network device 204.

At block 450, in response to determining the associated NH state info of the successive state info collection indicates the forwarding information included in the successive state info collection should be used for forwarding the IP packet ("Yes" branch of block 445), the network device forwards the IP packet using the forwarding information included in the successive state info collection. For example, in response to determining associated NH state info 233 indicates the forwarding information included in state info collection 211 should be used for forwarding the first and second IP packets, network device 201 forwards the first and second IP packets using the forwarding information included in state info collection 211 to network device 204 (as illustrated in FIG. 3B), using TNH entry 223.

Referring again to block 445, in response to determining the associated NH state info of the successive state info collection indicates the forwarding information included in the successive state info collection should not be used for forwarding the IP packet ("No" branch), the network device returns to block 435 to select another proxy. For example, in response to determining associated NH state info 233 indicates the forwarding information included in state info collection 211 should not be used for forwarding the first and second IP packets, network device 201 selects a fourth proxy (not illustrated). It should be understood that the operations of blocks 435-445 generally are performed until an operational link is found, or all proxies in the associated proxy collection have been exhausted.

Figure 5:
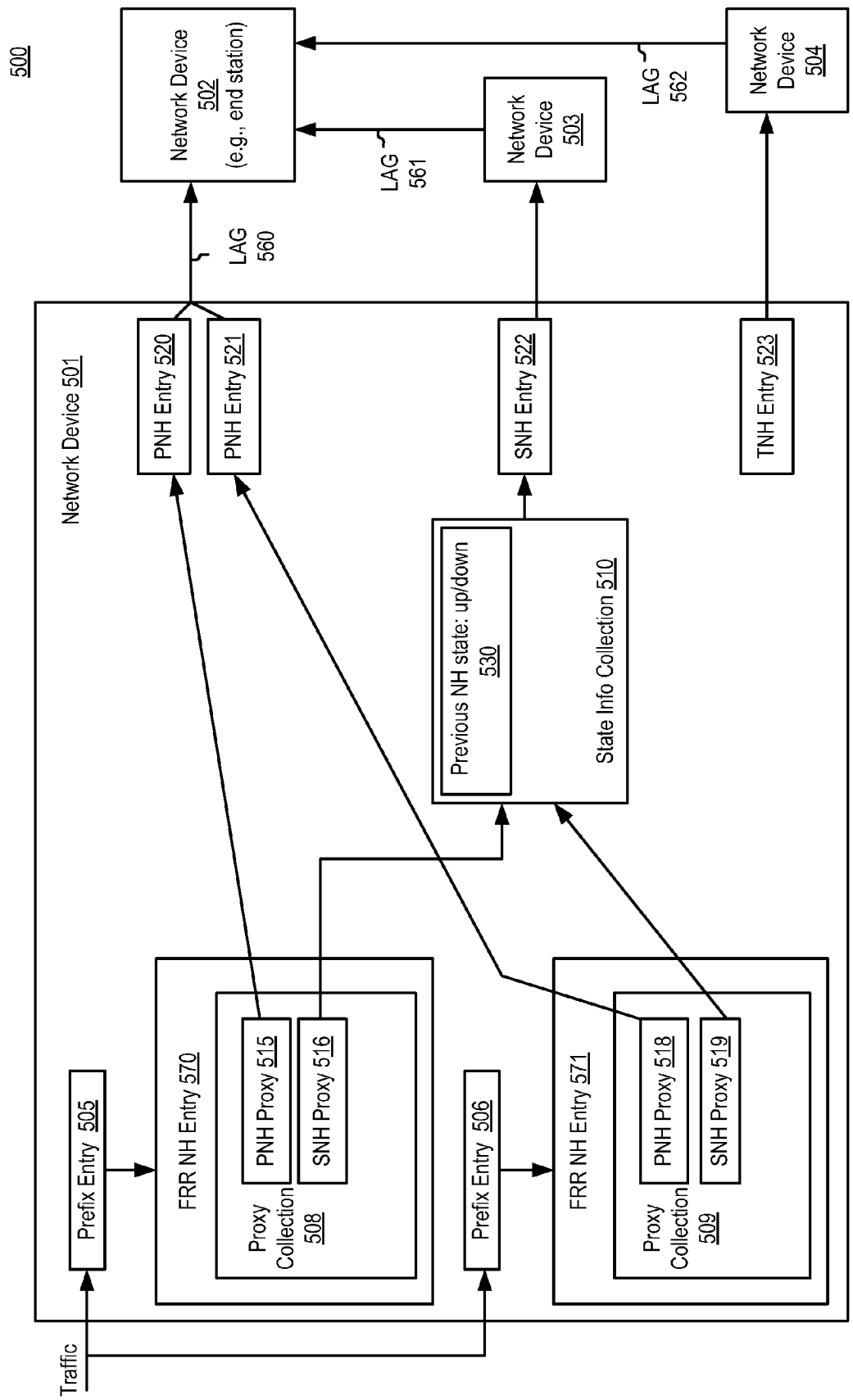
FIG. 5 is a block diagram illustrating a FRR device according to one embodiment.

FIG. 5 is a block diagram illustrating network 500 comprising of network devices 501-504. The network configuration shown in FIG. 5 is intended for illustrative purposes, and not intended to be limitations of the present invention.

In this illustrated example, network device 501 is communicatively coupled to network device 502 via LAG 560. In one embodiment, network device 501 and network devices 503 and/or 504 can form an inter-chassis redundancy (ICR) system. For example, network device 501 can be configured as an active ICR device while network devices 503 and/or 504 can be configured as standby ICR device(s). In such a configuration, network device 501 is to forward incoming IP traffic to network device 502 while LAG 560 is up (i.e., operational). In the event that LAG 560 is down (i.e., non-operational), the ICR devices switch roles, and network device 501 starts forwarding the incoming IP traffic to either network device 503 or 504, now operating as the active ICR device, which in turn will forward the traffic to network device 502 via LAGs 561 or 562, respectively. It should be understood that there can be other network devices that interconnect network devices 503 and 504 with network device 502. For example, LAGs 561-562 can connect devices 503-504, respectively, to one or more other network devices that connect to network device 502.

According to one embodiment, network device 501 includes a plurality of prefix entries, each of which includes information for associating incoming IP traffic with a corresponding FRR NH entry. In the illustrated example, prefix entry 505 associates incoming IP traffic with FRR NH entry 570, and prefix entry 506 associates incoming IP traffic with FRR NH entry 571. Thus, for example, when an incoming IP packet contains a destination IP address which belongs to (e.g., matches) the IP prefix contained in prefix entry 505, prefix entry 505 causes the IP packet to be processed/forwarded based on the information contained in FRR NH entry 570.

In one embodiment, FRR NH entry 570 comprises proxy collection 508, which includes, but is not limited to, PNH proxy 515 and SNH proxy 516. In one embodiment, PNH proxy 515 includes forwarding information for directly or indirectly causing the incoming IP traffic associated with proxy collection 508 to be forwarded to network device 502. In one embodiment, SNH proxy 516 includes information referencing state information (info) collection 510.

In one embodiment, FRR NH entry 571 comprises proxy collection 509, which includes, but is not limited to, PNH proxy 518 and SNH proxy 519. In one embodiment, PNH proxy 518 includes forwarding information for directly or indirectly causing the incoming IP traffic associated with proxy collection 509 to be forwarded to network device 502. Thus, the IP traffic associated with FRR NH entries 570-571 share fate. In one embodiment, SNH proxy 519 includes information referencing state info collection 510.

Conventionally, when LAG 560 fails, all FRR NH entries that share LAG 560 need to be individually reprogrammed to divert traffic to another network device (e.g., network device 503 or 504). The number of FRR NH entries which share LAG 560 can be in the thousands, and thus, the time to reconverge all such FRR NH entries can be on the order of seconds. Embodiments of the present invention overcome such limitations by providing state info collection 510.

In one embodiment, state info collection 510 includes forwarding information for directly or indirectly causing the incoming IP traffic associated with proxy collections 508 and 509 to be forwarded to network device 503. According to one embodiment, state info collection 510 includes previous NH state 530. Previous NH state 530 contains information indicating whether the links associated with the previous proxy (e.g., PNH proxies 515 and 518) are up (i.e., operational). In such an embodiment, the information contained in previous NH state 530 can be used for determining whether the forwarding information included in the previous proxy (e.g., PNH proxies 515 and 518) should be used for forwarding the incoming IP traffic. For example, a state value of "UP" in previous NH state 530 indicates that the forwarding information included in the previous proxy (e.g., PNH proxies 515 and 518) should be used for forwarding the incoming IP traffic.

It should be noted that although only two FRR NH entries are illustrated as sharing state info collection 510, network device 501 can, and typically does, include more FRR NH entries that reference state info collection 510, thus, enabling the quick reconvergence of all such FRR NH entries when a shared LAG (e.g., LAG 560) fails. The use of proxy collections 508-509 and state info collection 510 for performing fast reconvergence of FRR NH entries 570-571 shall now be illustrated through the description of FIGS. 6A and 6B.

Figure 6A:
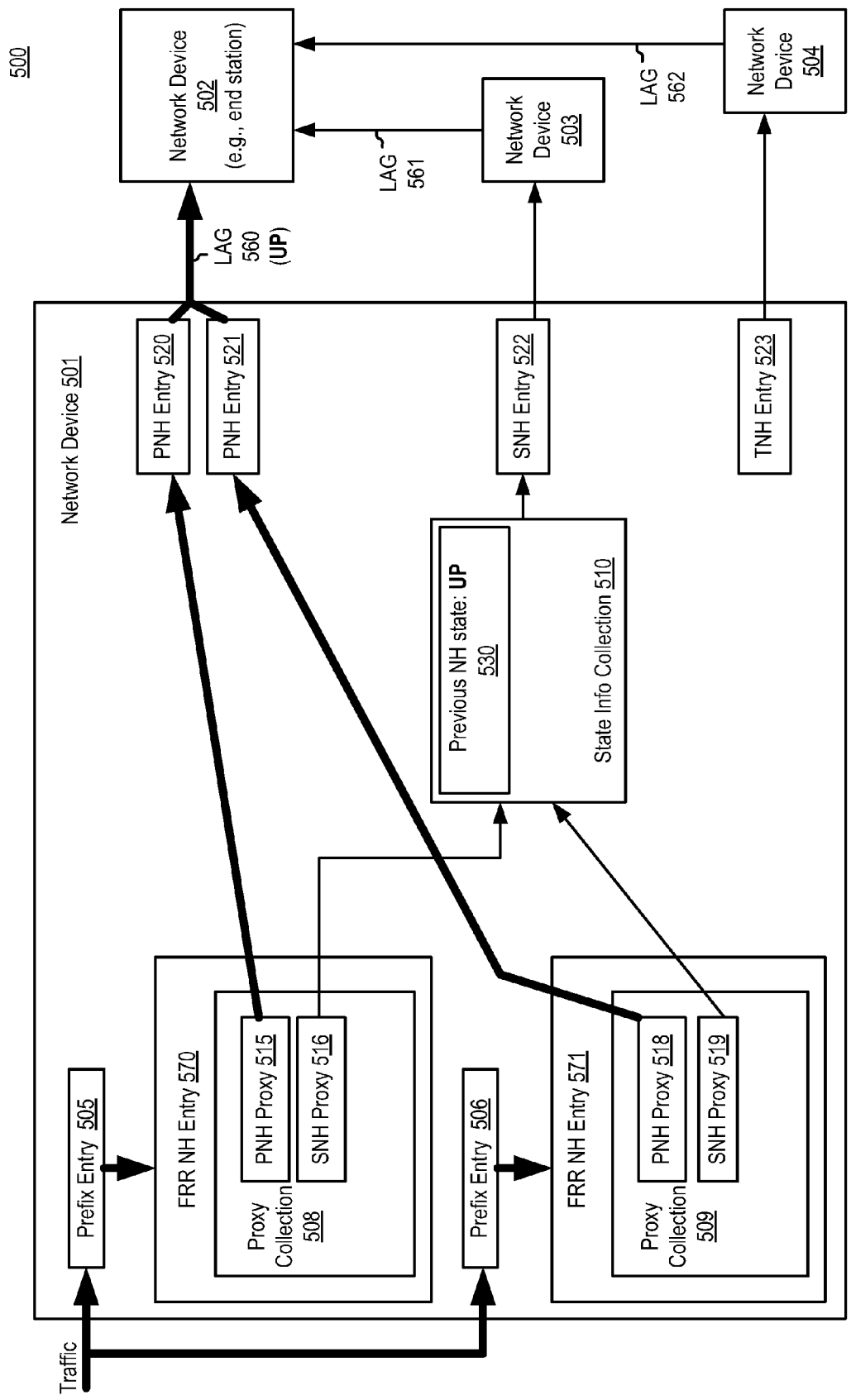
FIG. 6A is a block diagram illustrating a FRR device according to one embodiment.
Figure 6B:
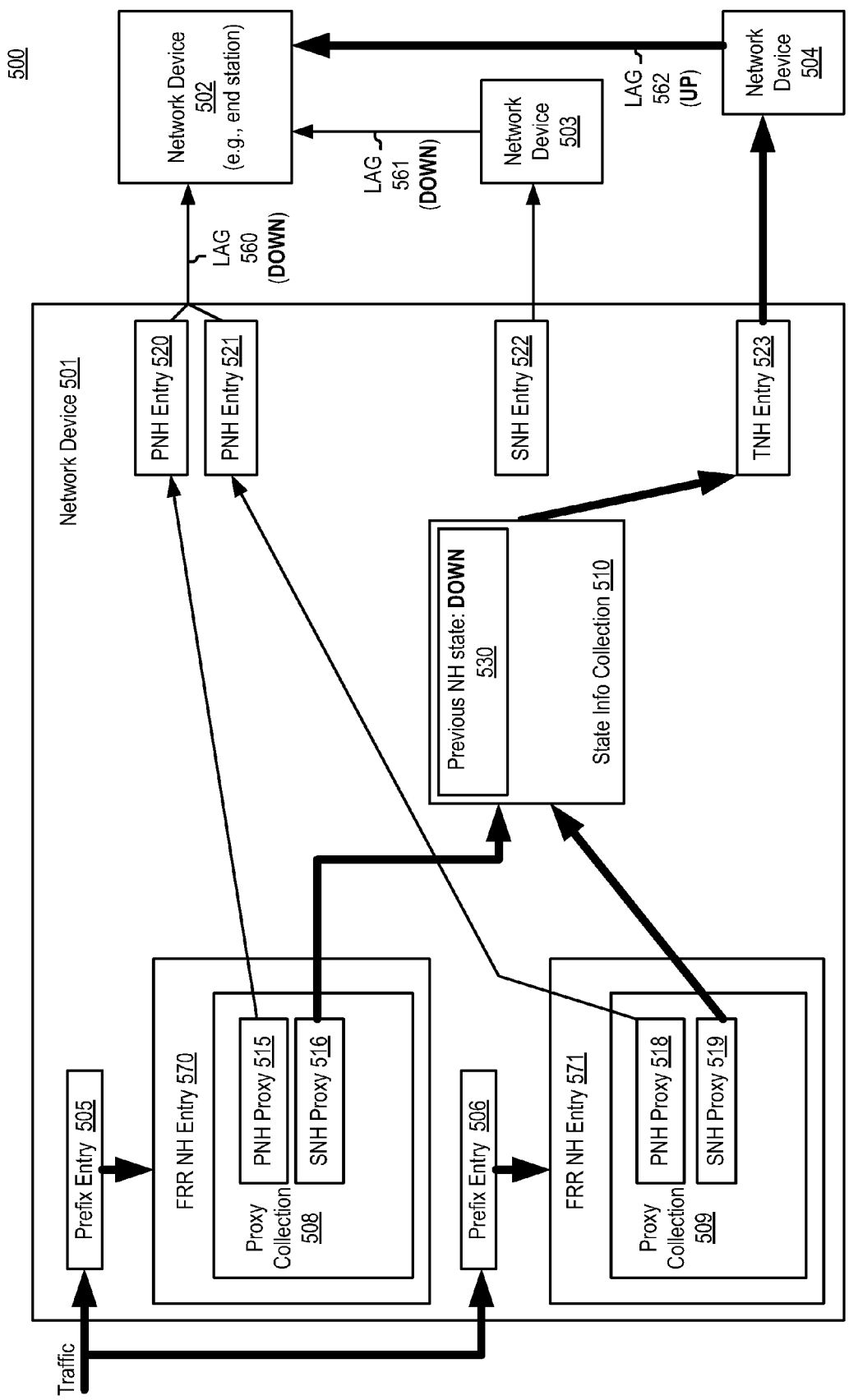
FIG. 6B is a block diagram illustrating a FRR device according to one embodiment.

FIGS. 6A-6B are block diagrams illustrating network 500 comprising of network devices 501-504. Networks 500 of FIGS. 6A-6B are similar to network 500 of FIG. 5. For the sake of brevity, networks 500 of FIGS. 6A-6B will not be described here. FIG. 6A illustrates the case where LAG 560 is up (i.e., operational), and thus, network device 501 has configured previous NH state 530 to indicate the links associated with PNH proxies 515 and 518 are up. A state value of "UP" in previous NH state 530 indicates the forwarding information included in PNH proxies 515 and 518 should be used for forwarding IP traffic associated with proxy collections 508 and 509, respectively. Thus, in response to receiving IP traffic that are associated with proxy collections 508 and 509, network device 501 uses the forwarding information contained in PNH proxies 515 and 518, respectively, to forward the IP traffic to network device 502 using PNH entries 520 and 521, respectively, and LAG 560.

FIG. 6B illustrates the case where LAG 560 is down (i.e., non-operational), and thus, network device 501 has configured previous NH state 530 to indicate the links associated with PNH proxies 515 and 518 are down. A state value of "DOWN" in previous NH state 530 indicates the forwarding information included in PNH proxies 515 and 518 should not be used for forwarding IP traffic associated with proxy collections 508 and 509, respectively. In FIG. 6B, LAG 561 is also down (i.e., non-operational). LAG 562, however, is up (i.e., operational) in FIG. 6B. Thus, network device 501 has configured the forwarding information included in state info collection 510 to cause incoming IP traffic associated with proxy collections 508 and 509 to be forwarded to network device 504. Thus, in response to receiving IP traffic that are associated with proxy collections 508 and 509, network device 501 uses the forwarding information contained in state info collection 510 to forward the IP traffic to network device 504 for using LAG 562, instead of attempting to forward the IP traffic using the downed LAGs 560-561 to network device 502.

It should be noted that by configuring previous NH state 530 with the state value of "DOWN", network device 501 is able to reprogram all FRR NH entries which forwarded their IP traffic to LAGs 560-561 (e.g., FRR NH entries 570-571) to divert/redirect their IP traffic to network device 504 (which in turn will forward the IP traffic on LAG 562). Contrary to a conventional FRR device, network device 501 does not need to individually reprogram each of the thousands of FRR NH entries when LAGs 560-561 are down.

Figure 7:
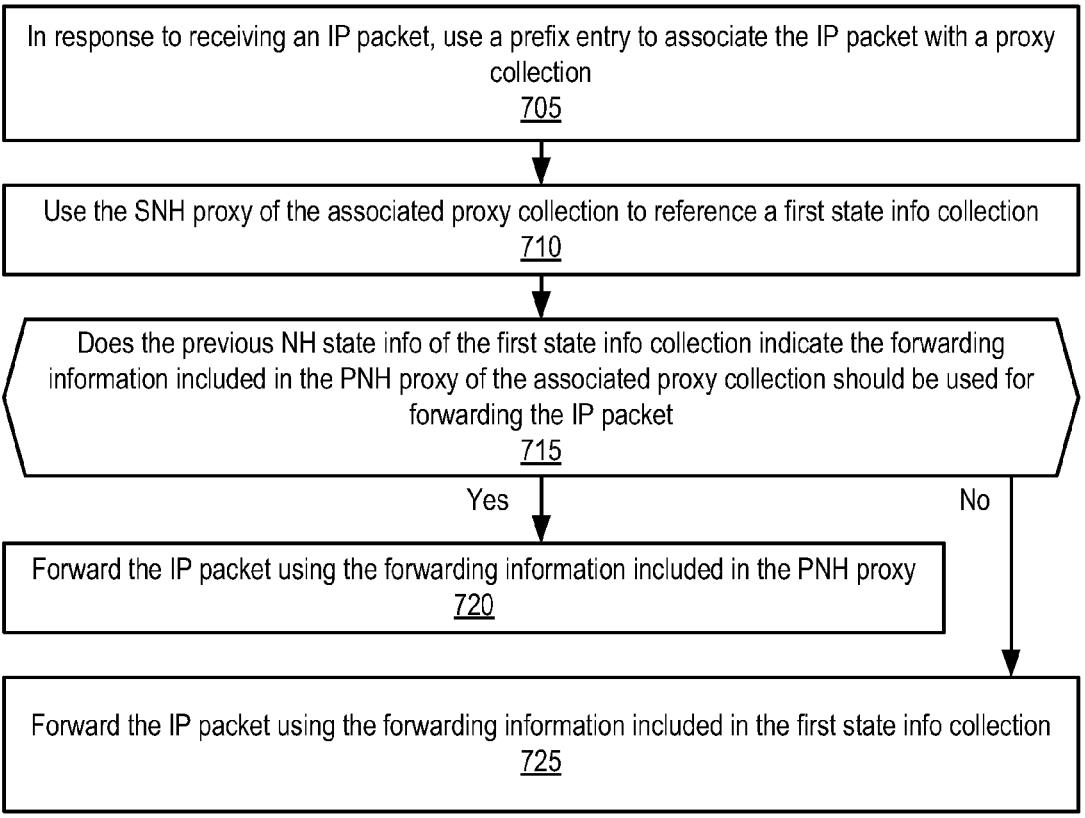
FIG. 7 is a flow diagram illustrating a method for performing fast reconvergence of FRR NH entries according to one embodiment.

FIG. 7 is a flow diagram illustrating a method for forwarding IP packets according to one embodiment. For example, method 700 can be performed by network device 501, which can be implemented in software, firmware, hardware, or any combination thereof. FIG. 7 shall now be described with reference to the embodiments illustrated in FIGS. 6A-6B.

Referring now to FIG. 7, at block 705, a network device in response to receiving an IP packet, uses a prefix entry to associate the IP packet with a proxy collection. For example, network device 501 receives a first IP packet with a destination IP address that belongs to (e.g., matches) the IP prefix contained in prefix entry 505, and a second IP packet with a destination IP address that belongs to the IP prefix contained in prefix entry 506. Accordingly, network device 501 uses prefix entries 505-506 to associate the first and second IP packets, respectively, to proxy collections 508-509, respectively.

At block 710, the network device uses the SNH proxy of the associated proxy collection to reference a first state info collection. For example, network device 501 uses SNH proxies 516 and 519 to reference state info collection 510. At block 715, the network device determines whether the previous NH state info of the first state info collection indicates the forwarding information included in the PNH proxy of the associated proxy collection should be used for forwarding the IP packet. For example, network device 501 determines whether previous NH state info 530 contains a state value of "UP", indicating the forwarding information included in PNH proxies 515 and 518 should be used for forwarding the first and second IP packets, respectively.

At block 720, in response to determining the previous NH state info of the first state info collection indicates the forwarding information included in the PNH proxy of the associated proxy collection should be used for forwarding the IP packet ("Yes" branch of block 715), the network device forwards the IP packet using the forwarding information included in the PNH proxy of the associated proxy collection. For example, in response to determining previous NH state info 530 indicates the forwarding information included in PNH proxies 515 and 518 should be used for forwarding the first and second IP packets, respectively, network device 501 forwards the first and second IP packets using the forwarding information included in PNH proxies 515 and 518, respectively, to LAG 560 (as illustrated in FIG. 6A), using PNH entries 520 and 521, respectively.

At block 725, in response to determining the previous NH state info of the first state info collection indicates the forwarding information included in the PNH proxy of the associated proxy collection should not be used for forwarding the IP packet ("No" branch of block 715), the network device forwards the IP packet using the forwarding information included in the first state info collection. For example, in response to determining previous NH state info 530 indicates the forwarding information included in PNH proxies 515 and 518 should not be used for forwarding the first and second IP packets, respectively, network device 501 forwards the first and second IP packets using the forwarding information included in state info collection 510 to network device 504 (as illustrated in FIG. 6B), using TNH entry 523.

FIG. 8 is a flow diagram illustrating a method for generating FRR NHs and state info collections according to one embodiment. For example, method 800 can be performed by network devices 201 or 501, which can be implemented in software, firmware, hardware, or any combination thereof. Referring now to FIG. 8, at block 805, a network device generates a first prefix entry (e.g., prefix entry 505) and a second prefix entry (e.g., prefix entry 506), wherein the first prefix entry and the second prefix entry include information for associating incoming IP traffic to a first data structure (e.g., proxy collection 508) and a second data structure (e.g., proxy collection 509), respectively.

At block 810, the network device generates the first data structure by generating a first proxy (e.g., PNH proxy 515) of the first data structure that includes forwarding information for causing the incoming IP traffic to be forwarded to a second network device (e.g., network device 502), and generating a second proxy (e.g., SNH proxy 516) of the first data structure that references a third data structure (e.g., state info collection 510).

At block 815, the network device generates the second data structure by generating a first proxy (e.g., PNH proxy 518) of the second data structure that includes forwarding information for causing the incoming IP traffic to be forwarded to the second network device, and generating a second proxy (e.g., SNH proxy 519) of the second data structure that references the third data structure.

At block 820, the network device generates the third data structure, wherein the third data structure includes forwarding information for causing the incoming IP traffic to be forwarded to a third network device (e.g., network device 503), and wherein the third data structure further includes first state information (e.g., previous NH state 530) indicating whether the forwarding information included in the first proxy of the first data structure and the first proxy of the second data structure should be used for forwarding the incoming IP traffic.

Figure 9A:
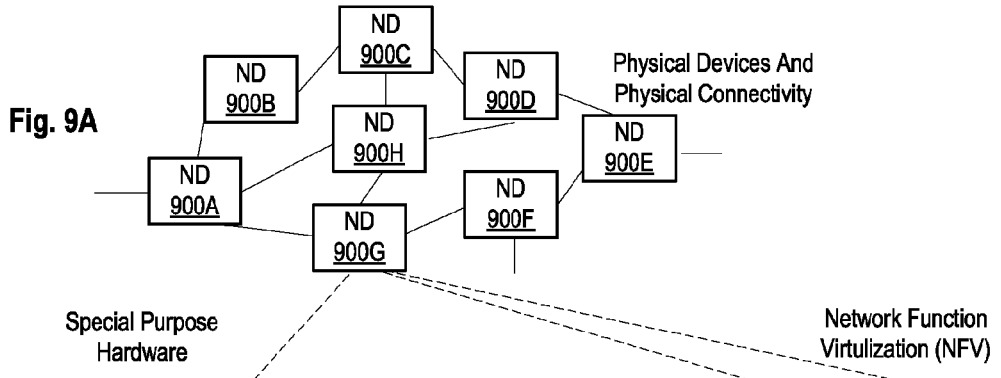
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code which when executed by networking hardware 910, causes networking hardware 910 to perform operations of one or more embodiments of the present invention as part networking software instances 922.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
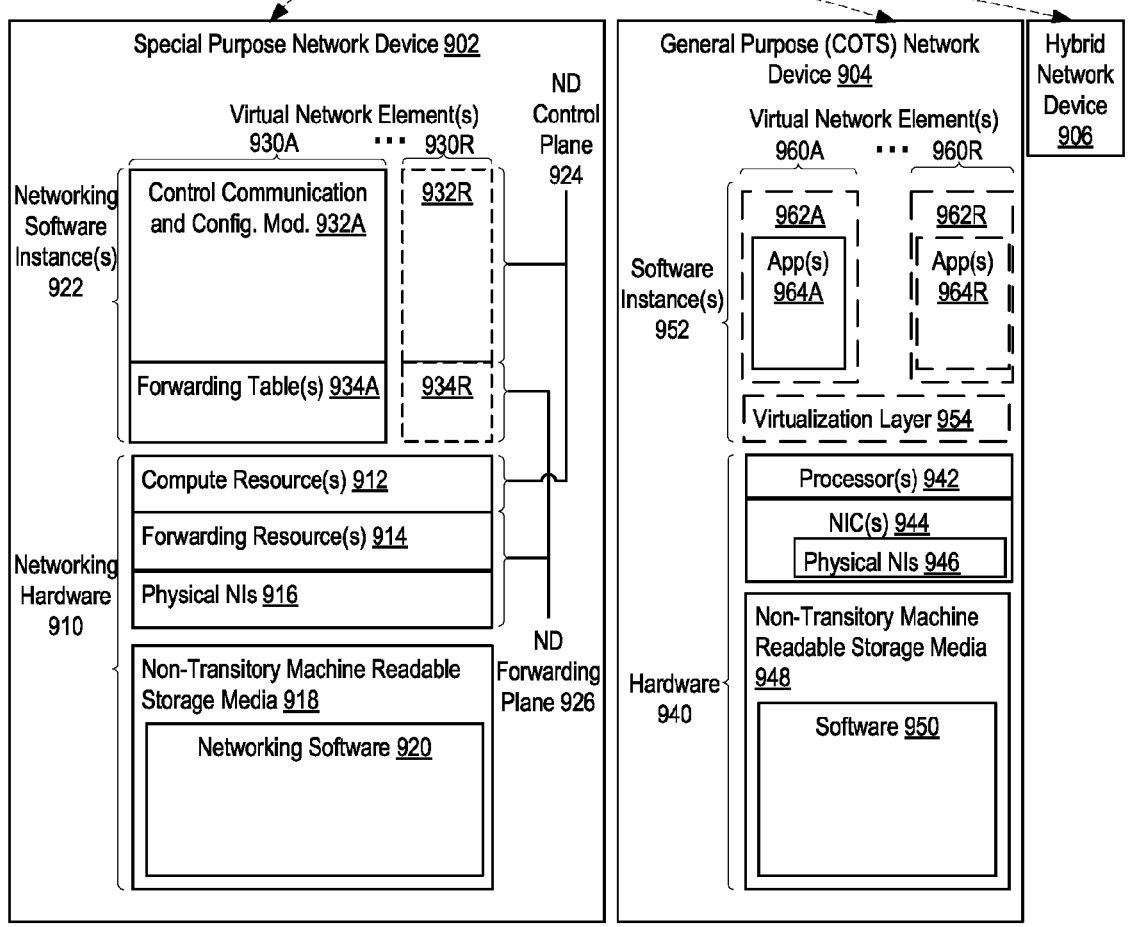
FIG. 9B illustrates an exemplary way to implement a special-purpose network device according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is rum the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

Software 950 can include code which when executed by processor(s) 942, cause processor(s) 942 to perform operations of one or more embodiments of the present invention as part software containers 962A-R.

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 9C:
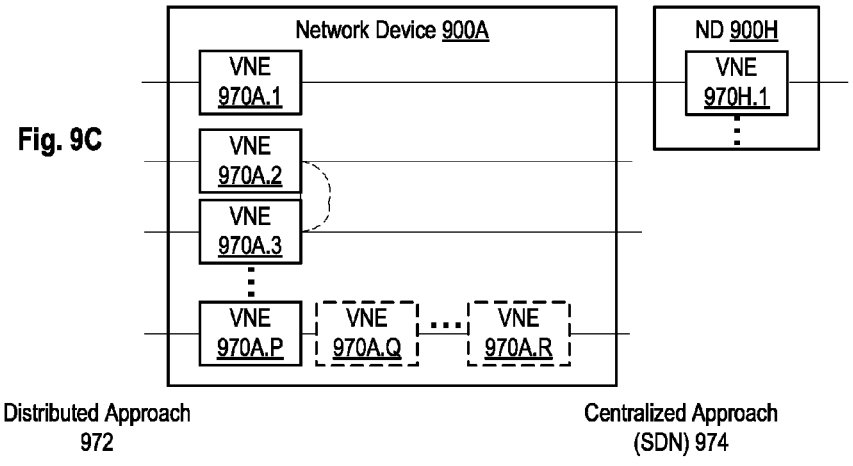
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service— e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
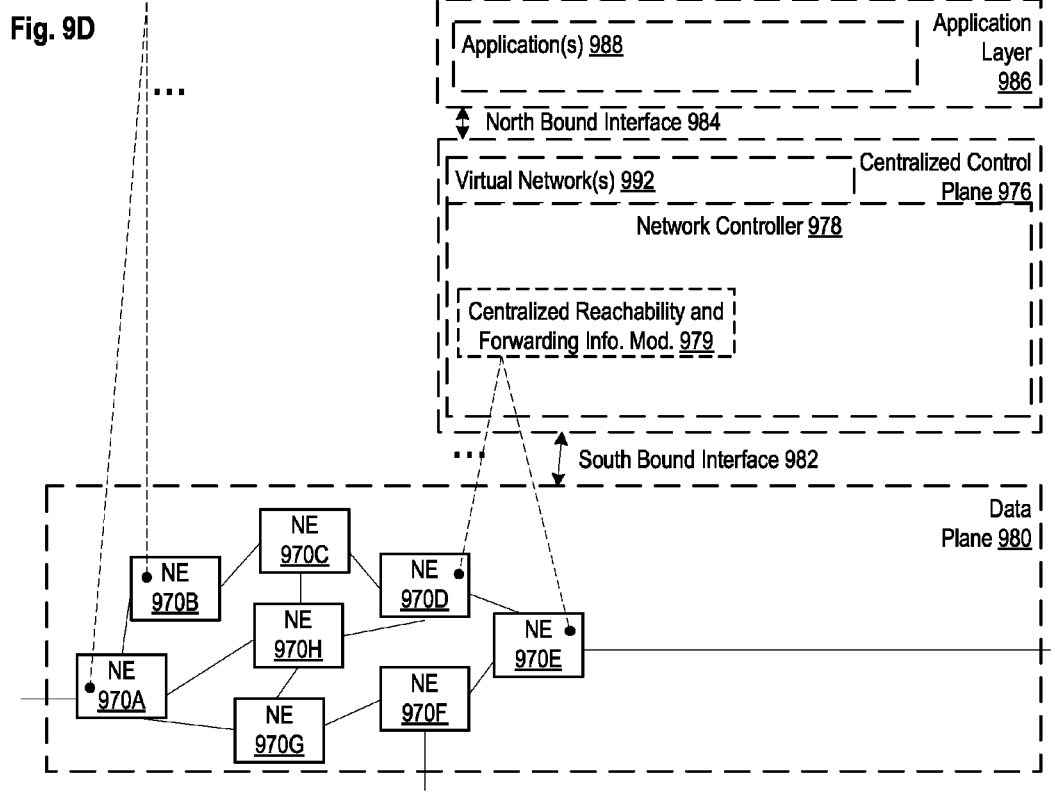
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s)

992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
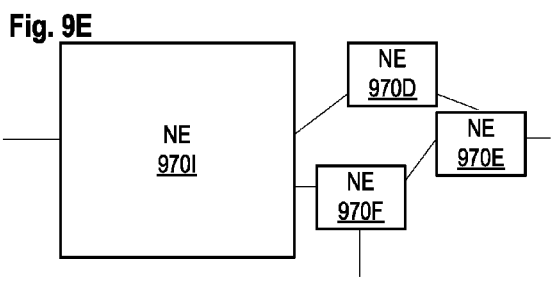
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
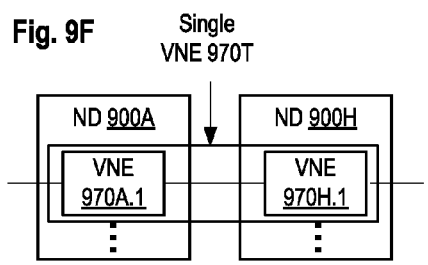
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
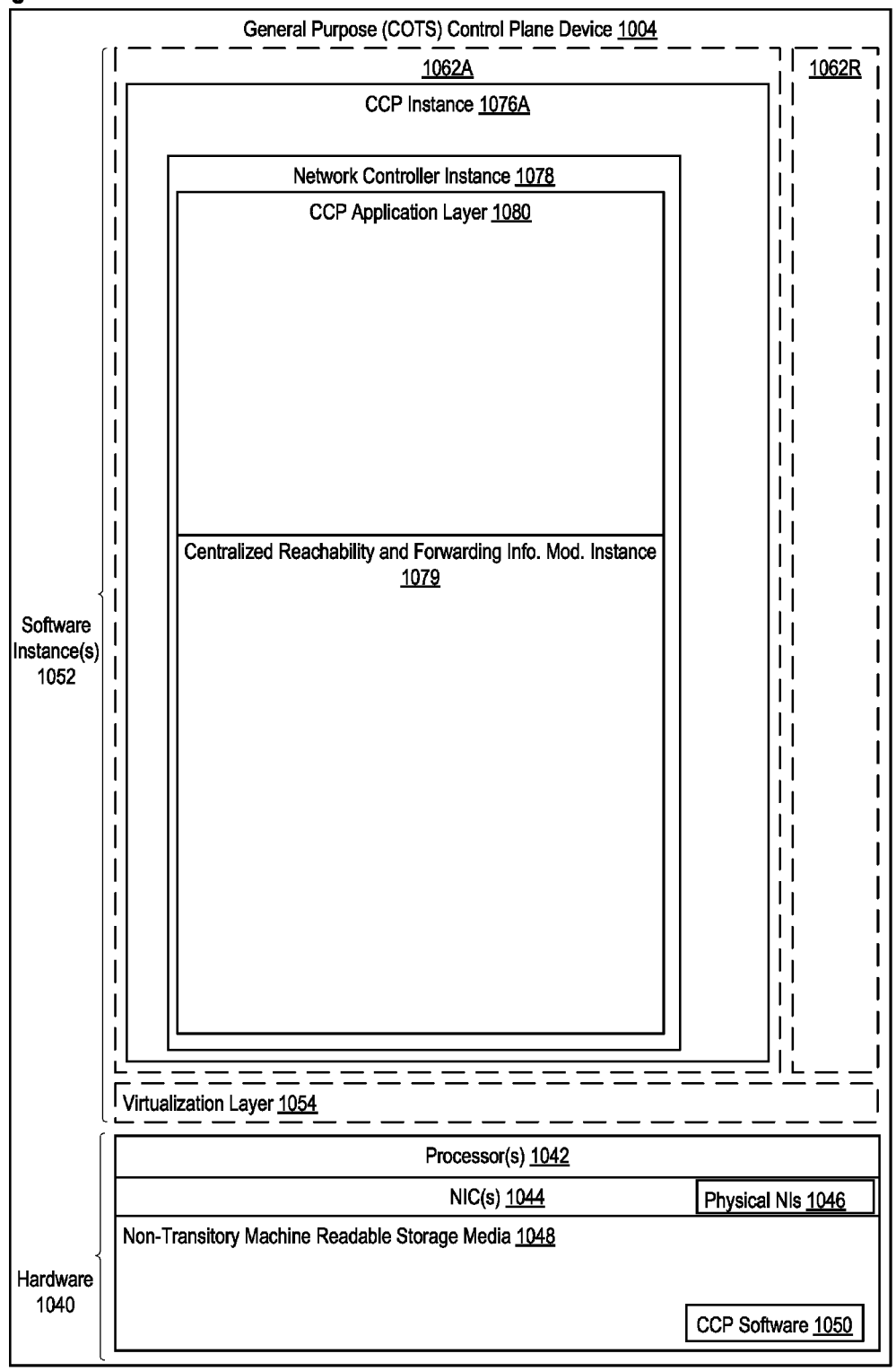
FIG. 10 illustrates a general purpose control plane device with centralized control plane (CCP) software, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method comprising:
generating, by a first network device that is communicatively coupled to a plurality of other network devices in a network, a first prefix entry and a second prefix entry, wherein the first prefix entry and the second prefix entry include information for associating incoming Internet Protocol (IP) traffic to a first data structure and a second data structure, respectively;
generating, by the first network device, the first data structure by:
    generating a first proxy of the first data structure that includes forwarding information for causing the incoming IP traffic to be forwarded to a second network device, and
    generating a second proxy of the first data structure that references a third data structure;
generating, by the first network device, the second data structure by:
    generating a first proxy of the second data structure that includes forwarding information for causing the incoming IP traffic to be forwarded to the second network device, and
    generating a second proxy of the second data structure that references the third data structure; and
generating, by the first network device, the third data structure, wherein the third data structure includes forwarding information for causing the incoming IP traffic to be forwarded to a third network device, and wherein the third data structure further includes first state information indicating whether the forwarding information included in the first proxy of the first data structure and the first proxy of the second data structure should be used for forwarding the incoming IP traffic,
wherein the first prefix entry, the second prefix entry, the first data structure, the second data structure, and the third data structure are all separate from each other.

2. The method of claim 1, further comprising:
in response to receiving an IP packet, using the first prefix entry to associate the IP packet to the first data structure;
using the second proxy of the first data structure to reference the third data structure; and
in response to determining the first state information of the third data structure indicates that the forwarding information included in the first proxy of the first data structure should be used for forwarding the IP packet, using the forwarding information included in the first proxy of the first data structure to forward the IP packet to the second network device.

3. The method of claim 1, further comprising:
in response to a network failure that prevents network traffic from being forwarded to the second network device, updating the first state information of the third data structure to indicate that the forwarding information included in the first proxy of the first data structure and the first proxy of the second data structure should not be used for forwarding the incoming IP traffic to the second network device.

4. The method of claim 3, further comprising:
in response to receiving an IP packet, using the second prefix entry to associate the IP packet to the second data structure;
using the second proxy of the second data structure to reference the third data structure; and
in response to determining the first state information of the third data structure indicates that the forwarding information included in the first proxy of the second data structure should not be used for forwarding the IP packet, using the forwarding information included in the third data structure to forward the IP packet to the third network device.

5. The method of claim 1, wherein
generating the first data structure further comprises generating a third proxy of the first data structure that references a fourth data structure;
the third data structure further includes second state information indicating whether the forwarding information included in the third data structure should be used for forwarding the incoming IP traffic; and
the method further comprises generating the fourth data structure, wherein the fourth data structure includes forwarding information for causing the incoming IP traffic to be forwarded to a fourth network device, and wherein the fourth data structure further includes third state information indicating whether the forwarding information included in the fourth data structure should be used for forwarding the incoming IP traffic.

6. The method of claim 5, further comprising:
in response to receiving an IP packet, using the first prefix entry to associate the IP packet to the first data structure;
using the second proxy of the first data structure to reference the third data structure;
in response to determining the first state information of the third data structure indicates that the forwarding information included in the first proxy of the first data structure should not be used for forwarding the IP packet, using the second state information of the third data structure to determine how to forward the IP packet;

in response to determining the second state information of the third data structure indicates that the forwarding information included in the third data structure should not be used for forwarding the IP packet, using the third state information of the fourth data structure to determine how to forward the IP packet; and in response to determining the third state information of the fourth data structure indicates that the forwarding information included in the fourth data structure should be used for forwarding the IP packet, using the forwarding information included in the fourth data structure to forward the IP packet to the fourth network device.

7. The method of claim 1, wherein the first network device is configured to serve as an active inter-chassis redundancy (ICR) device of an ICR system, and the third network device is configured to serve as a standby ICR device of the ICR system.

8. A first network device that is communicatively coupled to a plurality of other network devices in a network, the first network device comprising:
 a set of one or more processors; and
 a non-transitory machine-readable storage medium containing code, which when executed by the set of one or more processors, causes the first network device to:
  generate a first prefix entry and a second prefix entry, wherein the first prefix entry and the second prefix entry include information for associating incoming Internet Protocol (IP) traffic to a first data structure and a second data structure, respectively;
  generate the first data structure by:
   generating a first proxy of the first data structure that includes forwarding information for causing the incoming IP traffic to be forwarded to a second network device, and
   generating a second proxy of the first data structure that references a third data structure;
  generate the second data structure by:
   generating a first proxy of the second data structure that includes forwarding information for causing the incoming IP traffic to be forwarded to the second network device, and
   generating a second proxy of the second data structure that references the third data structure; and
  generate the third data structure, wherein the third data structure includes forwarding information for causing the incoming IP traffic to be forwarded to a third network device, and wherein the third data structure further includes first state information indicating whether the forwarding information included in the first proxy of the first data structure and the first proxy of the second data structure should be used for forwarding the incoming IP traffic,
  wherein the first prefix entry, the second prefix entry, the first data structure, the second data structure, and the third data structure are all separate from each other.

9. The first network device of claim 8, wherein the non-transitory machine- readable storage medium further contains code, which when executed by the set of one or more processors, causes the first network device to:
 in response to receiving an IP packet, use the first prefix entry to associate the IP packet to the first data structure;
 use the second proxy of the first data structure to reference the third data structure; and in response to determining the first state information of the third data structure indicates that the forwarding information included in the first proxy of the first data structure should be used for forwarding the IP packet, use the forwarding information included in the first proxy of the first data structure to forward the IP packet to the second network device.

10. The first network device of claim 8, wherein the non-transitory machine-readable storage medium further contains code, which when executed by the set of one or more processors, causes the first network device to:
 in response to a network failure that prevents network traffic from being forwarded to the second network device, update the first state information of the third data structure to indicate that the forwarding information included in the first proxy of the first data structure and the first proxy of the second data structure should not be used for forwarding the incoming IP traffic to the second network device.

11. The first network device of claim 10, wherein the non-transitory machine-readable storage medium further contains code, which when executed by the set of one or more processors, causes the first network device to:
 in response to receiving an IP packet, use the second prefix entry to associate the IP packet to the second data structure;
 use the second proxy of the second data structure to reference the third data structure; and
 in response to determining the first state information of the third data structure indicates that the forwarding information included in the first proxy of the second data structure should not be used for forwarding the IP packet, use the forwarding information included in the third data structure to forward the IP packet to the third network device.

12. The first network device of claim 8, wherein
 generating the first data structure further comprises generating a third proxy of the first data structure that references a fourth data structure;
 the third data structure further includes second state information indicating whether the forwarding information included in the third data structure should be used for forwarding the incoming IP traffic; and
 the non-transitory machine-readable storage medium further contains code, which when executed by the set of one or more processors, causes the first network device to generate the fourth data structure, wherein the fourth data structure includes forwarding information for causing the incoming IP traffic to be forwarded to a fourth network device, and wherein the fourth data structure further includes third state information indicating whether the forwarding information included in the fourth data structure should be used for forwarding the incoming IP traffic.

13. The first network device of claim 12, wherein the non-transitory machine-readable storage medium further contains code, which when executed by the set of one or more processors, causes the first network device to:
 in response to receiving an IP packet, use the first prefix entry to associate the IP packet to the first data structure;
 use the second proxy of the first data structure to reference the third data structure;
 in response to determining the first state information of the third data structure indicates that the forwarding information included in the first proxy of the first data structure should not be used for forwarding the IP packet, use the second state information of the third data structure to determine how to forward the IP packet;

in response to determining the second state information of the third data structure indicates that the forwarding information included in the third data structure should not be used for forwarding the IP packet, use the third state information of the fourth data structure to determine how to forward the IP packet; and in response to determining the third state information of the fourth data structure indicates that the forwarding information included in the fourth data structure should be used for forwarding the IP packet, use the forwarding information included in the fourth data structure to forward the IP packet to the fourth network device.

14. The first network device of claim 8, wherein the first network device is configured to serve as an active inter-chassis redundancy (ICR) device of an ICR system, and the third network device is configured to serve as a standby ICR device of the ICR system.

15. A non-transitory machine-readable storage medium having computer code stored therein, which when executed by a processor of a first network device that is communicatively coupled to a plurality of other network devices in a network, causes the first network device to perform operations comprising:

generating a first prefix entry and a second prefix entry, wherein the first prefix entry and the second prefix entry include information for associating incoming Internet Protocol (IP) traffic to a first data structure and a second data structure, respectively;

generating the first data structure by:

generating a first proxy of the first data structure that includes forwarding information for causing the incoming IP traffic to be forwarded to a second network device, and generating a second proxy of the first data structure that references a third data structure;

generating the second data structure by:

generating a first proxy of the second data structure that includes forwarding information for causing the incoming IP traffic to be forwarded to the second network device, and generating a second proxy of the second data structure that references the third data structure; and generating the third data structure, wherein the third data structure includes forwarding information for causing the incoming IP traffic to be forwarded to a third network device, and wherein the third data structure further includes first state information indicating whether the forwarding information included in the first proxy of the first data structure and the first proxy of the second data structure should be used for forwarding the incoming IP traffic, wherein the first prefix entry, the second prefix entry, the first data structure, the second data structure, and the third data structure are all separate from each other.

16. The non-transitory machine-readable storage medium of claim 15, further comprising:

in response to receiving an IP packet, using the first prefix entry to associate the IP packet to the first data structure;

using the second proxy of the first data structure to reference the third data structure; and in response to determining the first state information of the third data structure indicates that the forwarding information included in the first proxy of the first data structure should be used for forwarding the IP packet, using the forwarding information included in the first proxy of the first data structure to forward the IP packet to the second network device.

17. The non-transitory machine-readable storage medium of claim 15, further comprising:

in response to a network failure that prevents network traffic from being forwarded to the second network device, updating the first state information of the third data structure to indicate that the forwarding information included in the first proxy of the first data structure and the first proxy of the second data structure should not be used for forwarding the incoming IP traffic to the second network device.

18. The non-transitory machine-readable storage medium of claim 17, further comprising:

in response to receiving an IP packet, using the second prefix entry to associate the IP packet to the second data structure;

using the second proxy of the second data structure to reference the third data structure; and in response to determining the first state information of the third data structure indicates that the forwarding information included in the first proxy of the second data structure should not be used for forwarding the IP packet, using the forwarding information included in the third data structure to forward the IP packet to the third network device.

19. The non-transitory machine-readable storage medium of claim 15, wherein generating the first data structure further comprises generating a third proxy of the first data structure that references a fourth data structure;

the third data structure further includes second state information indicating whether the forwarding information included in the third data structure should be used for forwarding the incoming IP traffic; and the non-transitory machine-readable storage medium further contains computer code, which when executed by the processor of the first network device causes the first network device to perform operations comprising generating the fourth data structure, wherein the fourth data structure includes forwarding information for causing the incoming IP traffic to be forwarded to a fourth network device, and wherein the fourth data structure further includes third state information indicating whether the forwarding information included in the fourth data structure should be used for forwarding the incoming IP traffic.

20. The non-transitory machine-readable storage medium of claim 19, further comprising:

in response to receiving an IP packet, using the first prefix entry to associate the IP packet to the first data structure;

using the second proxy of the first data structure to reference the third data structure;

in response to determining the first state information of the third data structure indicates that the forwarding information included in the first proxy of the first data structure should not be used for forwarding the IP packet, using the second state information of the third data structure to determine how to forward the IP packet;

in response to determining the second state information of the third data structure indicates that the forwarding information included in the third data structure should not be used for forwarding the IP packet, using the third state information of the fourth data structure to determine how to forward the IP packet; and in response to determining the third state information of the fourth data structure indicates that the forwarding information included in the fourth data structure should be used for forwarding the IP packet, using the forwarding information included in the fourth data structure to forward the IP packet to the fourth network device.

21. The non-transitory machine-readable storage medium of claim 15, wherein the first network device is configured to serve as an active inter-chassis redundancy (ICR) device of an ICR system, and the third network device is configured to serve as a standby ICR device of the ICR system.

* * * * *